United States Patent [19]

Kohinata et al.

[11] Patent Number: 5,451,279
[45] Date of Patent: Sep. 19, 1995

[54] METHOD FOR JOINING CERAMIC SINTERED BODIES

[75] Inventors: Masayoshi Kohinata; Makoto Toriumi; Hirokazu Tanaka; Hideaki Yoshida, all of Saitama, Japan

[73] Assignee: Mitsubishi Materials Corporation, Tokyo, Japan

[21] Appl. No.: 127,795

[22] Filed: Sep. 28, 1993

[30] Foreign Application Priority Data

Oct. 1, 1992 [JP] Japan .................. 4-286599

[51] Int. Cl.⁶ .................. B32B 31/12; B32B 31/26
[52] U.S. Cl. .................. 156/89; 228/121; 264/60; 264/65; 264/66
[58] Field of Search .................. 156/89; 228/121; 264/60, 65, 66

[56] References Cited

U.S. PATENT DOCUMENTS

| | | | |
|---|---|---|---|
| 3,540,957 | 11/1970 | Bawa et al. | 156/89 |
| 3,966,885 | 6/1976 | May | 156/89 X |
| 4,347,089 | 8/1982 | Loehman | 156/89 |
| 4,420,352 | 12/1983 | Schroeder et al. | 156/89 |
| 4,621,277 | 11/1986 | Ito et al. | 257/639 X |
| 4,824,008 | 4/1989 | Luszcz et al. | 156/89 X |
| 4,871,107 | 10/1989 | Yamada et al. | 228/121 |
| 4,884,737 | 12/1989 | Newkirk et al. | 228/121 |
| 5,028,451 | 7/1991 | Ito et al. | 427/575 X |
| 5,098,494 | 3/1992 | Reisman | 156/89 |
| 5,246,685 | 9/1993 | Greco et al. | 423/439 X |

OTHER PUBLICATIONS

James F. Shackelford, Introduction to Materials Science for Engineers, 1985, p. 199.

*Primary Examiner*—David A. Simmons
*Assistant Examiner*—M. Curtis Mayes
*Attorney, Agent, or Firm*—Vineet Kohli; Thomas R. Morrison

[57] ABSTRACT

A method for joining two ceramic sintered bodies with a joining layer. A magnesium layer is deposited on the ceramic sintered bodies to form a magnesium nitride layer. The joining layer has a component in common with a base component of the ceramic sintered bodies. The laminate is heat treated under conditions that convert the joining layer into a material substantially identical to that of the ceramic sintered bodies, whereby a homogeneous strong laminate results. The ceramic sintered body may be either an oxide, carbide or nitride. The joining layer is a metal corresponding to the base material of the ceramic sintered bodies. After joining, the joining layer is then nitrided. The resulting laminate has improved strength, and heat and corrosion resistance properties.

4 Claims, 3 Drawing Sheets

METHOD FOR JOINING CERAMIC SINTERED BODIES

BACKGROUND OF THE INVENTION

This invention relates to methods for joining ceramic sintered bodies. More specifically, this invention relates to a method for joining aluminum nitride base plates, alumina ceramic base plates, ceramic parts for automobiles and other types of ceramic bodies.

Conventional methods for joining ceramic base plates use a solder material between the two base plates. The combination is then heated to a prescribed temperature.

The problem with the above method is that the properties of the solder material and the base plates are different. The strength of the solder material decreases at elevated temperatures. In addition, the heat and corrosion resistance of the solder material are different from the base plates.

OBJECTS AND SUMMARY OF THE INVENTION

Accordingly it is an object of this invention to provide a method for joining ceramic sintered bodies which overcomes the drawbacks of the prior art.

It is another object of this invention to provide a method for joining ceramic sintered bodies which exhibits improved strength at elevated temperatures and improved heat and corrosion resistance properties by homogenizing the joining layer of the ceramic sintered body with the two ceramic sintered bodies being joined.

It is still another object of this invention to provide a simpler and less costly method for joining ceramic sintered bodies.

It is still another object of this invention to provide a method for joining ceramic sintered bodies which reduces the difficulty and expense in producing complex ceramic shapes.

Briefly stated, there is provided a method for joining two ceramic sintered bodies with a joining layer. The joining layer has a component in common with a base component of the ceramic sintered bodies. The laminate is heat treated under conditions that convert the joining layer into a material substantially identical to that of the ceramic sintered bodies, whereby a homogeneous strong laminate results. The ceramic sintered body may be either an oxide, carbide or nitride. The joining layer is a metal corresponding to the base material of the ceramic sintered bodies. After joining, the joining layer is then either oxidized, carbonized or nitrided, depending on the materials of the ceramic sintered bodies. The resulting laminate has improved strength, and heat and corrosion resistance properties.

According to an embodiment of the invention there is provided a method for joining first and second ceramic sintered bodies, comprising: disposing a joining layer between and in contact with opposing surfaces of the first and second ceramic sintered bodies to form a laminate, the joining layer having a difference in a component present in the first and second sintered bodies, and heating the laminate in an atmosphere effective to convert the joining layer into a ceramic having a substantially similar composition as the first and second ceramic sintered bodies such that the laminate is fused together into a substantially homogeneous structure.

According to another embodiment of the invention there is provided a method for joining first and second ceramic sintered bodies, formed of a material including a metal oxide, comprising: disposing a joining layer including a metal of the metal oxide between and in contact with opposing surfaces of the first and second ceramic sintered bodies to form a laminate, heating the laminate in a non-oxidizing atmosphere so as to join the first and second ceramic sintered bodies, and heating the laminate in an oxidizing atmosphere so as to oxidize the joining layer.

According to still another embodiment of the invention there is provided a method for joining first and second ceramic sintered bodies, formed of a material including a metal oxide and silicon dioxide, comprising: disposing a joining layer, including a metal of the metal oxide, between and in contact with opposing surfaces of the first and second ceramic sintered bodies to form a laminate, heating the laminate in a nonoxidizing atmosphere so as to join the first and second ceramic sintered bodies, and heating and oxidizing the joining layer by a reaction between the joining layer and the silicon dioxide.

According to a feature of the invention there is provided a method for joining first and second ceramic sintered bodies, formed of a material including a metal nitride comprising: disposing a joining layer, including a metal of the metal nitride, between and in contact with opposing surfaces of the first and second ceramic sintered bodies to form a laminate, heating the laminate in a non-oxidizing atmosphere so as to join the first and second ceramic sintered bodies, and heating and nitriding the laminate so as to nitride the joining layer substantially the same as the first and second ceramic sintered bodies.

According to another feature of the invention there is provided a method for joining first and second ceramic sintered bodies, formed of a material including aluminum nitride, comprising: depositing a magnesium layer on opposing surfaces of the first and second ceramic sintered bodies, heating the first and second ceramic sintered bodies having the magnesium layer disposed thereon to form a magnesium nitride layer on a surface of the first and second sintered bodies, disposing a joining layer, including aluminum, between and in contact with opposing surfaces of the first and second ceramic sintered bodies to form a laminate, heating the laminate in a non-oxidizing atmosphere so as to join the first and second ceramic sintered bodies, and heating and nitriding the laminate so as to nitride the joining layer substantially the same as the first and second ceramic sintered bodies.

According to yet another feature of the invention there is provided a method for joining first and second ceramic sintered bodies, formed of a material including a metal carbide comprising: disposing a joining layer, including a metal of the metal carbide, between and in contact with opposing surfaces of the first and second ceramic sintered bodies to form a laminate, heating the laminate in a non-oxidizing atmosphere so as to join the first and second ceramic sintered bodies, and heating and carbonizing the laminate so as to carbonize the joining layer substantially the same as the first and second ceramic sintered bodies.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
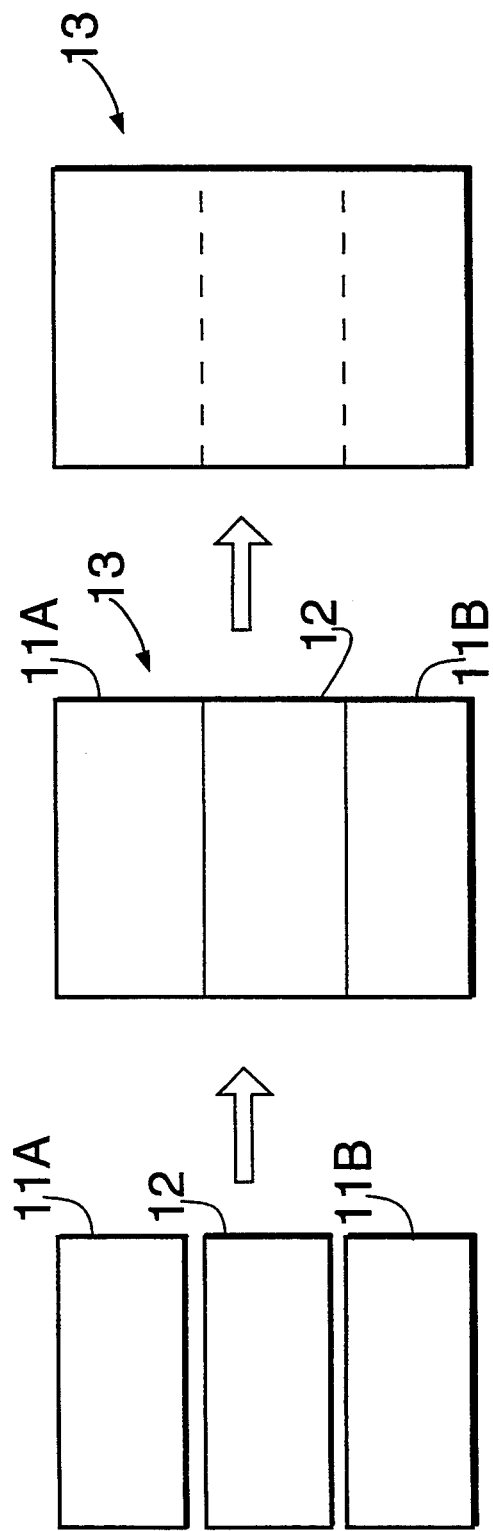
FIG. 1 is a schematic view for illustrating a method for joining sintered bodies, according to an embodiment of the present invention.
Figure 2:
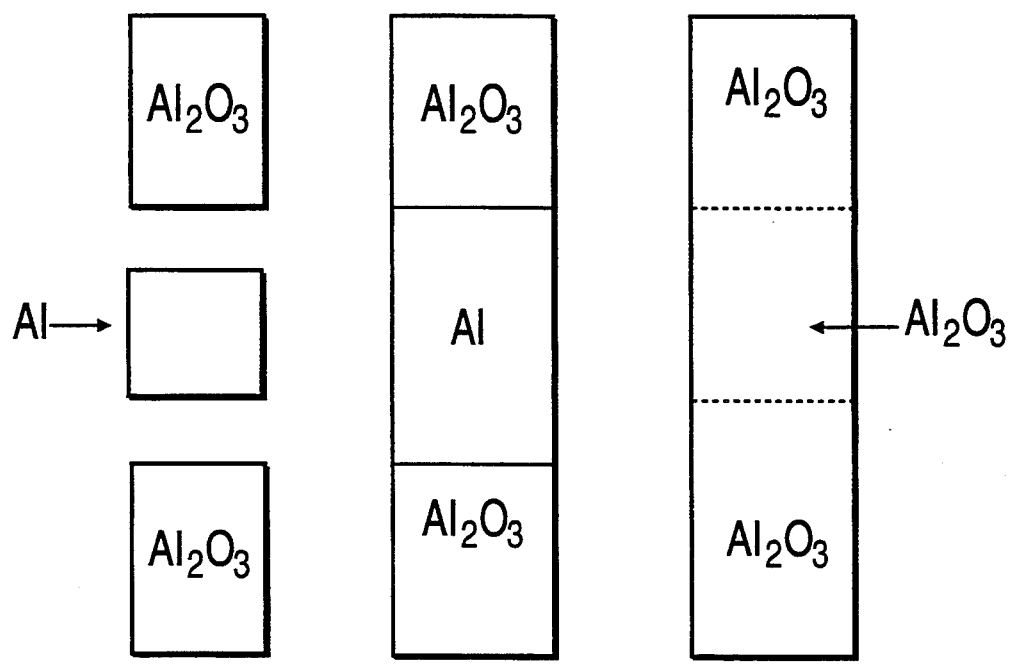
FIG. 2 is an illustrative view of a method for joining alumina sintered bodies as shown in FIG. 1.

Referring to FIGS. 1 and 2, a method for joining ceramic sintered bodies is illustrated wherein first and second alumina base plates 11A, 11B contain 1 to 10% silicon dioxide by weight, alkaline earth elements such as magnesium, calcium, and 90 to 99% alumina by weight.

A joining layer 12 of powdered aluminum or aluminum alloy is interposed between alumina base plates 11A and 11 B, and pressed together to form a laminate 13. Laminate 13 is heated at a temperature of from about 650 to about 700 ÛC. in a non-oxidizing atmosphere. This heating sinters the particles of powdered aluminum or aluminum alloy to each other, and to adjacent surfaces of first and second alumina base plates 11A and 11B. Following this sintering step, laminate 13 is heated and oxidized in an oxidizing atmosphere at a temperature of from about 1000 to about 1500 ÛC. for from about 2 to about 10 hours. During this process, aluminum joining layer 12 is oxidized by the oxygen in the atmosphere to form alumina. That is, during the oxidizing step, the aluminum joining layer 12 is converted from powdered aluminum or aluminum alloy into the same material as that of which alumina base plates 11A and 11B are composed. As a result, laminate 13 becomes homogenous with alumina sintered bodies 11A and 11B, and oxidized joining layer 12, all being composed of the same material.

In the aforementioned embodiment, base plates 11A and 11B have up to 10% silicon dioxide. Silicon dioxide acts as a source of oxygen to oxidize the aluminum of joining layer 12. Alternatively, instead of including silicon dioxide in base plates 11A and 11B, an oxide paste containing silicon dioxide may be coated on the surfaces of base plates 11A and lib abutting joining layer. This sufficiently oxidizes joining layer 12 converting joining layer 12 into a material generally equivalent to the material of base plates 11A and 11B. In this embodiment as well, the final laminate 13 is homogenous throughout.

The amount of aluminum and silicon alloy in joining layer 12 is selected such that sufficient silicon is present so that the oxide ratio in alumina base plates 11A and 11B and in joining layer 12 are nearly the same after oxidation.

The present invention homogenizes the joining layer 12 with the remainder of laminate 13. As a result, the strength of the finished laminate 13 remains high, even at elevated temperatures. In fact, the strength of the finished laminate 13 is about the same as the strength of alumina base plates 11A and 11B. This also improves the heat and corrosion resistance properties of the laminate 13. The present invention thus produces unified alumina laminate 13 by a simple method.

In the prior art, complex shapes are formed by precision casting. Precision casting is both difficult and costly. The present invention, in addition to being simple, is less costly.

In another embodiment of the present invention, base plates 11A and 11B are composed of aluminum nitride base plates, each having a thickness of 0.5 min. Joining layer 12 is an aluminum plate having a thickness of 5 to 15 μm. Alternatively, base plates 11A and 11B may be mirror finish aluminum nitride plates with a surface roughness of not more than Ra=0.01 μm. Joining layer 12 is an aluminum plate with an evaporated thickness below 1 μm. The laminate is heated at a temperature of 700 to 1000 ÛC. under a vacuum of approximately $10^{-4}$ Torr. This results in good joining of the laminate.

In this embodiment, the laminate is heated above the melting point of aluminum (up to 500–1500 ÛC.) in a nitrogen atmosphere to combine the aluminum plate with nitrogen in order to form aluminum nitride. This produces a homogenous aluminum nitride sintered body.

The above method is also applicable for ceramics composed of silicon nitrides and titanium nitrides. In each case, the composition of the joining layer 12 is dependent upon the type of ceramic body. The remaining steps of the method are identical.

Figure 3:
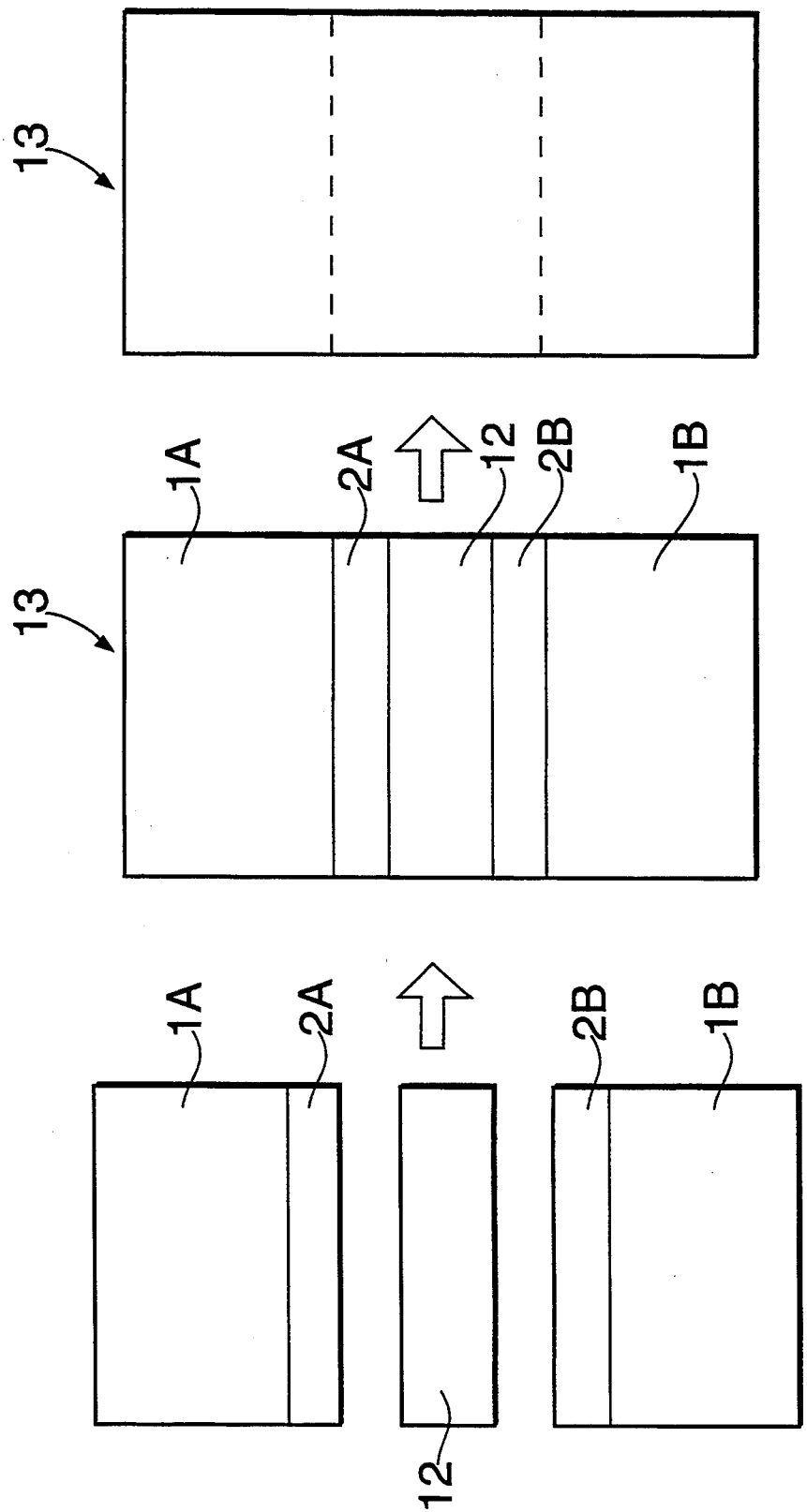
FIG. 3 is a schematic view for illustrating a method for joining aluminum nitrate sintered bodies according to a second embodiment of the present invention.

Referring to FIG. 3, a still further embodiment joins two aluminum nitride base plates 1A and 1B each having a thickness of 0.5 min. A 20 μm layer of magnesium 2A is evaporated on a surface aluminum nitride base plate 1A. A 20 μm layer of magnesium 2B is evaporated on a surface of aluminum nitride base plates 1B. Aluminum nitride base plates 1A and 1B are heated to a temperature of 800–1200 ÛC. in a nitrogen atmosphere or in an ammonia steam to convert magnesium layers 2A and 2B to magnesium nitride layers on facing surface of aluminum nitride base plates 1A and 1B. A joining layer 12 is an aluminum plate having a thickness of 25 μm. Joining layer 12 is pressed between magnesium nitride layers 2A and 2B and the sandwich is joined by heating at a temperature of 700–1000 ÛC. under a vacuum of approximately $10^{-4}$ Torr.

This results in the elements of laminate 13 having good adhesion with each other. Heating laminate 13 at a temperature above the melting point of aluminum (up to 800–1200 ÛC.) and in a nitrogen atmosphere under a vacuum of approximately $10^{-2}$ Torr, results in the following reaction: $2Al + Mg_3N_2 \rightarrow 2AlN + 3Mg \uparrow$.

Magnesium nitride layers 2A and 2B react with aluminum to produce aluminum nitride and magnesium. Magnesium evaporates as a gas from laminate 13 due to its high vapor pressure. Aluminum joining layer 12 fuses, reacts with magnesium nitride, and combines with nitrogen to form aluminum nitride. In addition, unreactive aluminum is nitrided by nitrogen in the atmosphere to form aluminum nitride. Therefore, laminate 13 becomes an aluminum nitride sintered body.

The joining layer 12 in laminate 13 is homogenized with the remainder of laminate to provide a strength at elevated temperatures of the finished body equivalent to the strength of aluminum nitride base plates 1A and 1B. In addition, the heat and corrosion resistance properties are improved. This method for joining an aluminum nitride sintered body is much simpler than the prior art and is more cost effective.

Alternatively, instead of forming the magnesium nitride layers 2A and 2B in the manner described above, they may be formed by applying a magnesium paste onto the aluminum nitride base plates 1A and 1B and heating the paste in a nitrogen atmosphere or an ammonia steam.

The layers are joined together in the following order to form a laminate 13: aluminum nitride base plate 1A, magnesium nitride layer 2A, aluminum joining layer 12, magnesium nitride layer 2B, and aluminum nitride base plate 1B.

In a still another embodiment, silicon carbide plates 11A and 11B are used to form the ceramic sintered body. Each of base plates 11A and 11B has a surface roughness of Ra=0.01 μm or less and a 1-3 μm layer of silicon evaporated onto its surface. This laminate 13 is heated at a temperature of 1300 to 1500 ÛC. under a vacuum of approximately $10^{-4}$ Torr. The laminate 13 is further heated at a temperature of 1400 to 1700 ÛC. in a carbon monoxide atmosphere.

A silicon joining layer 12 inserted between the silicon carbide plates 11A and 11B combines with the carbon produced from the decomposition of carbon monoxide to form silicon carbide. As a result, the laminate 13 becomes a unified or homogenous silicon carbide body.

This latter embodiment is also applicable to titanium carbides.

Table 1 shows the properties of the ceramic sintered bodies produced by the method of the present invention.

TABLE 1

|  | AlN | $Al_2O_3$ | SiC | $Si_3N_4$ |
|---|---|---|---|---|
| Atmosphere at time of joining or heating after joining | Nitrogen or mixture of nitrogen/ hydrogen | Oxidizing atmosphere | Carbon monoxide atmosphere | Nitrogen or ammonia atmosphere |
| Temp. at time of joining or heating after joining | 500 to 1000° C. | 1000 to 1500° C. | 1000 to 1800° C. | 1200 to 1400° C. |
| Pressure at time of joining or heating after joining | 1 atm | 1 atm | 1 atm | 1 atm |
| Transverse rupture strength kg/mm$^2$ | ~30 | 20–50 | ~50 | ~40 |
| Heat resistance | same as sintered body | same as sintered body | same as sintered body | same as sintered body |

Table 2 gives an example of some of the different combinations possible using the present invention.

TABLE 2

| Ceramics | Metal (joining material) | Treatment After Joining |
|---|---|---|
| $Si_3N_4$ | Silicon | Nitriding |
| AlN | Aluminum | Nitriding |
| SiC | Silicon | Carbonization |

In the present invention, the strength at an elevated temperature is approximately the same as that of the ceramic sintered body. In addition, there is an improvement in the heat and corrosion resistance properties of the finished ceramic sintered body. As a result of the simple methodology, complex shapes may be formed from the ceramic sintered bodies. This was difficult and costly using the conventional methods.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for joining first and second ceramic sintered bodies, formed of a material including aluminum nitride, comprising:

depositing a magnesium layer on opposing surfaces of said first and second ceramic sintered bodies;

heating said first and second ceramic sintered bodies having said magnesium layer disposed thereon to form a magnesium nitride layer on a surface of said first and second sintered bodies;

disposing a joining layer, including aluminum, between and in contact with opposing surfaces of said first and second ceramic sintered bodies to form a laminate;

heating said laminate in a non-oxidizing atmosphere so as to join said first and second ceramic sintered bodies; and heating and nitriding said laminate so as to nitride said joining layer substantially the same as said first and second ceramic sintered bodies.

2. A method for joining ceramic sintered bodies, as recited in claim 1, wherein said step of depositing is done by evaporating a layer of magnesium on said first and second ceramic sintered bodies.

3. A method for joining ceramic sintered bodies as recited in claim 1, wherein said step of depositing includes applying a magnesium paste on said first and second ceramic sintered bodies.

4. A method for joining ceramic sintered bodies as recited in claim 1, further comprising the step of heating in an atmosphere having a gas selected from the group consisting of nitrogen and ammonia.

* * * * *